United States Patent

Bennett

[15] 3,699,274

[45] Oct. 17, 1972

[54] APPARATUS FOR IDENTIFYING TELEPHONE CABLE PAIRS

[72] Inventor: Richard L. Bennett, Saugus, Calif.

[73] Assignee: Perkins Research & Mfg. Co., Canoga Park, Calif.

[22] Filed: July 22, 1971

[21] Appl. No.: 165,175

[52] U.S. Cl. ................................ 179/175, 179/175.3

[51] Int. Cl. ................................ H04m 3/26

[58] Field of Search ............ 179/175, 175.1 R, 175.3; 178/2 A; 324/66

[56] References Cited

UNITED STATES PATENTS 3,536,864 10/1970 Buhler ....................... 179/175

3,581,008 5/1971 Dal Monte ................. 178/2 A

*Primary Examiner*—Kathleen H. Claffy
*Assistant Examiner*—Douglas W. Olms
*Attorney*—Miketta, Glenny, Poms & Smith

[57] ABSTRACT

An apparatus for identifying telephone cable pairs which may be in use by the customer without disturbing service, including a tone source, a simplex device and a switch circuit working in conjunction with the simplex device using the pair capacity to operate the circuit only when the proper electrical connection is made between the tapping wires of the device and each of the pair wires.

10 Claims, 2 Drawing Figures

INVENTOR.
RICHARD L. BENNETT
BY
Miketta, Glenny, Poms & Smith
ATTORNEYS.

APPARATUS FOR IDENTIFYING TELEPHONE CABLE PAIRS

BACKGROUND AND PRIOR ART

In servicing and maintaining a telephone system, there must be provided some manner in which a particular telephone pair may be identified or tagged in relation to other pairs contained in a single cable. This identification or tagging of telephone pairs must be performed on a system in which the pair may be in use by the customer in which event it is highly important that the tagging can be performed without interference to the customer's service. At the present time, the identification of cable pairs utilizes a sine wave oscillator which produces an audible signal only on the pair to which the device is tapped and thus interferes only with the service connected to that particular pair. Various devices have been suggested and used for monitoring the cable pair so that the tone produced by the oscillator will not be applied to a pair which is in use so as to disturb the customer. This type of identification device is used only when the telephone pair is not in use since the signal or tone applied to the pair is audible.

However, there is an occasional need in servicing a telephone system to send an identifying tone or signaL on a telephone pair which is in use. Under such circumstances, three devices or methods have been suggested for applying the tone while the pair is in use without disturbing the user and thus permitting the tagging of the pair to be accomplished without waiting for the customer to discontinue use of the pair. One suggested solution to this problem is the use of high frequency tones which are above the hearing range of the user, usually 15 to 20 thousand Hz. The difficulty with this solution is that high frequency tones will not pass easily through some cables due to the presence of inductors, called load coils, which are placed in the cables to improve their transmission characteristics. Another difficulty with the use of high frequency tones is that such tones tend to spread or stray from the pair to which they are applied to other pairs in the cable making it difficult to tell which wire the tone is actually on.

A second solution to the problem was the suggestion that low frequency tones, below 150 Hz., and thus below the approximate cutoff range of the telephone receiver, be used for a tone source. Devices of this type have been largely unsuccessful because there is simply too much low frequency noise in a telephone cable so that there is an unsatisfactory signal to noise ratio making it more difficult, if not impossible, to detect and utilize the identification tone.

The most successful solution to the problem of applying an identifying tone to a telephone pair which is in use, that has thus far been suggested, is the use of a simplex device which is now well known in the art. In simplexing, signals which are in phase and of equal amplitude are applied to both wires of a telephone pair. Only a difference in the signals applied to the two wires of a pair are audible to a person using the pair since if the signals are in phase and of equal amplitude they will cancel out one another and thereby prevent any customer annoyance. It is an essential aspect of a simplex device that both signals be applied to the telephone wires of the pair since the presence of one signal would be audible to the user. It is therefore extremely important that good electrical connections be made when the device is tapped to a telephone pair since an improper connection on one of the taps would result in an audible signal and customer disturbance. It will also be appreciated that the simplex device must be provided with an on-off switch, which, in the prior art, comprises a manually operated switch. The simplex device must first be connected to a telephone pair before it is turned on since it is extremely improbable that both electrical connections through the tapping devices to each of the wires of the pair would be made simultaneously. Of course, as pointed out above, where one tap would make a connection before the other, an audible signal would be imposed on the pair. To avoid such disturbance, the simplex device is turned off until the taps are connected to the pair at which time the device may be turned on and used. For the same reason, the device must be turned off prior to disconnecting the taps from the telephone pair to prevent the audible signal from being imposed on the pair. Moreover, since the tapping connections to the telephone wires must be through easily releasable mechanical connections, such connection may be easily inadvertently disrupted during use of the simplex device so as to again result in the audible tone on the pair.

The primary difficulty with the use of the simplex device in connection with prior art control switches, is that such switches are simply not always used by the telephone service men in actual practice. For various reasons, the reliance upon a mechanical manual switch for control of the simplex device has been unsuccessful and has resulted in customer annoyance and dissatisfaction.

GENERAL STATEMENT OF THE INVENTION

In light of the above discussion of the prior art devices and the disadvantages and problems thereof, it is an object of the present invention to provide an automatic switch for a simplex device used in identifying or tagging telephone pairs in a telephone transmission system. Another object of the present invention is to provide an automatic switch for use with a simplex device so as to eliminate the necessity for a serviceman to control the application of simplex signals to a telephone pair thereby eliminating the possibility of customer annoyance. Another advantage and object of the present invention is to provide a device which simplifies and facilitates the identification and tagging of telephone pairs with a simplex device so as to reduce service labor costs in a telephone system. One more advantage of the present invention is to provide a device as above described which is economical to manufacture, is easily transported by servicemen, is foolproof in operation, and which will generally improve telephone service.

Generally, the present invention provides an apparatus for identifying telephone cable pairs which may be in use by the customer without disturbing user service or causing annoyance such as would occur if an audible signal or tone was applied to the pair, comprising a tone or signal source, such as an oscillator, a simplex device, a pair of tapping leads for electrically connecting the simplex device and tone source to the telephone pair, and capacity responsive switch circuit means for permitting application of the simplexed tone to the pair only when both of said pair of tapping leads are electrically connected to the telephone pair.

BRIEF DESCRIPTION OF THE PREFERRED EMBODIMENT

Figures 1, 2:
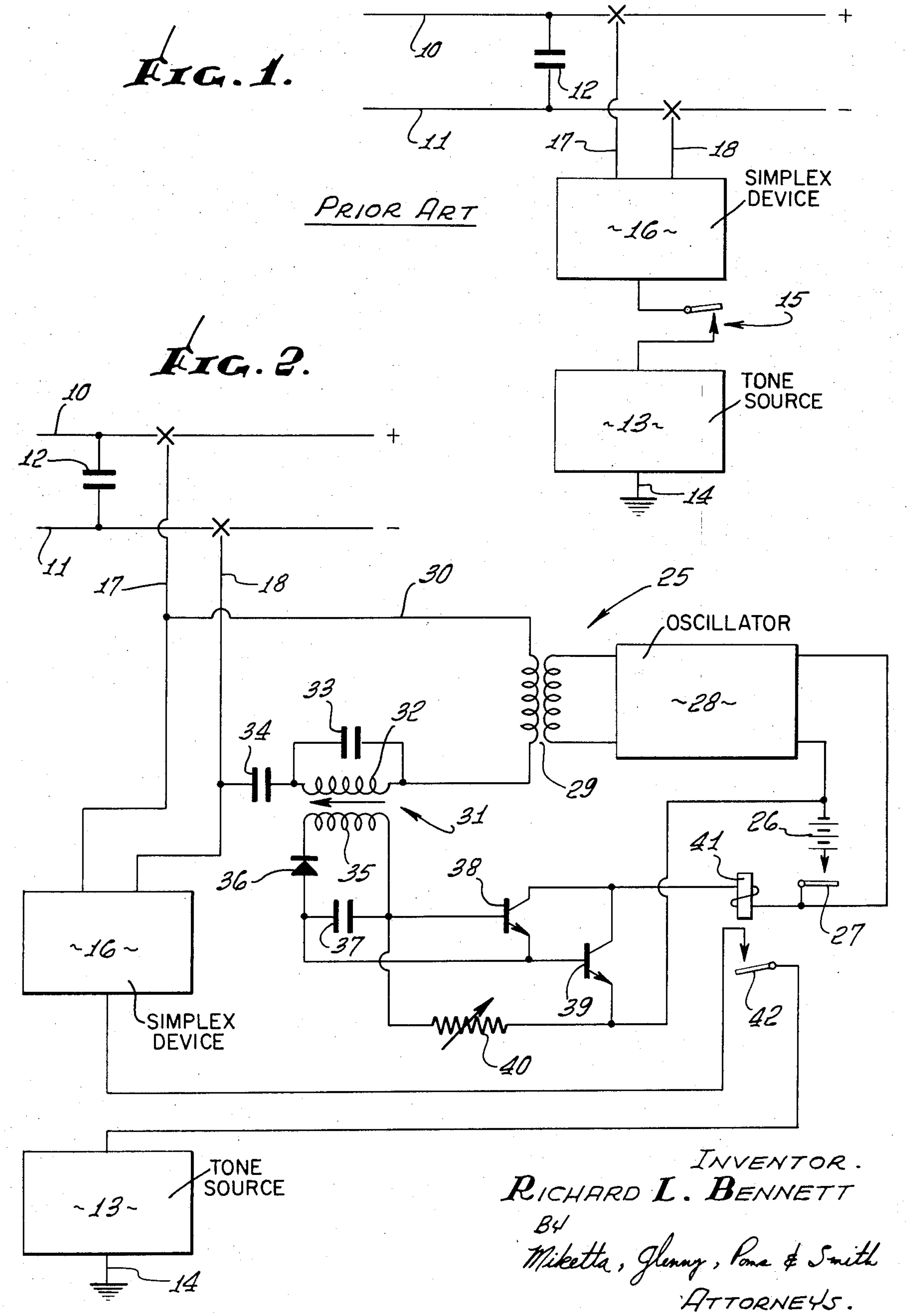
FIG. 1 is a circuit diagram of the prior art apparatus or system for identifying telephone cable pairs with the use of a simplex device.
FIG. 2 is a circuit diagram showing an exemplary embodiment of an apparatus for identifying telephone cable pairs constructed in accordance with the present invention.

As background for understanding the configuration and operation of the apparatus of the present invention and to appreciate the advantages thereof, there is shown in FIG. 1 the prior art apparatus for identifying telephone cable pairs using a simplex device. Referring to this figure, there is seen a pair of telephone wires 10, 11 which have a capacitance illustrated diagrammatically by the capacitor 12 between the wires 10 and 11. In conventional manner, the signal or tone used for identifying a particular telephone cable pair may comprise a tone source 13 connected to ground at 14 and connected through a manual switch 15 to a simplex device 16. The apparatus includes a pair of tapping leads 17, 18 which may be attached to telephone wires such as wires 10, 11, respectively.

This prior art apparatus is used by a telephone serviceman for identifying telephone cable pairs by attaching the leads 17, 18 to the wires 10, 11 to effect a good electrical connection and then manually operating switch 15 so as to connect the tone source 13 to the simplex device 16 and thereby applying signals of equal amplitude, and in phase, to the pair of wires 10, 11. So long as a good connection is made through the tapping leads prior to actuation of the switch 15, there will be no audible tone or signal on the telephone pair since the simplexed signals will cancel. When the pair has been identified, the serviceman must then again trip manual switch 15 prior to removing the tapping lead 17, 18 so that removal of one of the tapping leads prior to removal of the other will not produce an audible signal on the pair such as may occur is the switch was not turned off.

It will thus be seen that the prior art device if properly used by a serviceman would prevent the imposition of an audible signal on the telephone pair and would therefore preclude any annoyance or disturbance of the customer. However, if the manual switch 15 is left on and the leads 17, 18 are attached to the pair, an audible signal will result. Similarly, if the switch is left on and the leads are later removed, another audible signal will be applied to the pair and again the customer will be disturbed.

To overcome the difficulties of the aforedescribed prior art device, reference is now made to FIG. 2 illustrating an exemplary apparatus of the present invention for identifying telephone cable pairs. The telephone pair wires are again represented by the numerals 10, 11 having a capacitance represented at 12. The apparatus includes a tone source 13 attached to ground at 14 which may comprise an oscillator or similar tone producing device for a signal having a frequency of approximately 500 cycles. It will be understood that various oscillators are presently used in the telephone industry for cable pair identification which send signals at various frequencies and the 500 frequency oscillator referred to in the description of the exemplary embodiment of this invention is merely illustrative. The apparatus may also include a simplex device 16 for providing the signals of equal amplitude and in the same phase and may be a conventional device well known in the art. The simplex device 16 is connected to the telephone pair through tapping leads 17, 18 of conventional construction having, for example, manually attachable clips which automatically pierce the wire insulation when the clip is placed on the wire.

The improvement of the present invention comprises capacity responsive switch circuit means and an exemplary embodiment of such means is indicated generally at 25. The switch circuit means 25 permits the application of the simplex tone to the telephone pair only when both of the pair of tapping leads are properly electrically connected to the pair of wires. Such capacity responsive circuit in the exemplary embodiment may include a source of electrical power such as battery 26 which may be controlled by a manual switch 27 for turning on power to the apparatus. The circuit further includes an oscillator 28 and a signal having a frequency above the audible range such as a 15,000 cycle signal. Such oscillators are entirely conventional and common in the art. The oscillator 28 is connected through an output transformer 29 to isolate the oscillator from the telephone pair wires. It will of course be apparent that the oscillator may be connected directly to the telephone pair through the tapping means 17, 18 rather than through the transformer 29 depending upon its impedance and other variables. One end of the secondary winding of the transformer 29 is connected through the line 30 to tapping lead 17. The other end of transformer 29 is connected, in the exemplary embodiment, to a tunable transformer 31 including a primary winding 32 in parallel with a capacitor 33. The tunable transformer may be a tunable choke with AGC winding, as shown, but it will also be appreciated that it may not be necessary to use a tunable transformer depending upon the circuit configuration and components and an ordinary transformer may suffice. The tunable transformer 31 is connected to tapping lead 18 through a blocking capacitor 34 which is in series with the capacitance of the telephone pair wires 10, 11. Also, the potential of the signal on the telephone pair will be limited by the capacitor 34.

When tapping leads 17, 18 are electrically connected to the wires 10, 11, a load is placed across the circuit 25 so that current flow through the tunable transformer 31 will induce a voltage in the secondary winding 35 which may be rectified by the diode 36 and capacitor 37 and applied to a transistor switch circuit including the transistor 38, transistor 39, and the variable resistance 40 which biases the base of transistor 38 thereby establishing the on-off level for operation of transistor 38. It will be appreciated that resistor 40 need not be variable but will assist in establishing the on-off level desired for proper operation of the circuit. More specifically, the trigger level of the transistor 38 may be adjusted such that it will operate only in response to a voltage level that corresponds to a particular capacitance load. For example, since the capacitance of a given length of telephone wire may be easily determined, a voltage level for operation of the transistor 38 may be selected which corresponds to a given number of feet of telephone wire which determines the capacitance load on the switch circuit. It has been found that it is undesirable to set a very low load limit for the voltage required to turn on the transistor since such load may occur when a serviceman grasps the leads 17, 18 so as to place this resistance load across the leads which could result in triggering of the transistor 38 and therefore operation of the entire apparatus defeating the purpose of the present invention. To overcome the latter difficulty, a trigger voltage level is chosen which will not be affected by the above-described resistance load of the serviceman' s fingers but will cause the transistor to operate when, for example, the leads are attached to a cable of at least 50 feet in length. A fixed value resistor may then be chosen for biasing the transistor 38.

When transistor 39 turns on, current will flow through the winding of relay switch 41 so as to close the contacts 42 allowing the signal from oscillator 13 to be applied to the simplex device 16.

From the above description, the operation of the improved switch circuit of the present invention should be readily apparent. If either of the leads 17, 18 are not electrically connected to the wires 10, 11 of the telephone pair to be identified, no load will appear across the circuit and the switch will not turn on. Thus, the switch circuit of the present invention is responsive to the capacity of the telephone pair being tagged and is completely foolproof in operation and does not require a serviceman to turn on and off the simplex device and tone source prior to or after connection of the wire leads in order to prevent an audible signal from being imposed on the pair. Rather, the switch circuit 25 permits the tone to be applied to the telephone pair only when the leads are electrically connected so that the tone signals are in phase and of equal amplitude on both wires to thereby cancel out one another. No action is required on the part of the serviceman to assure that the customer will not be disturbed by the identification or tagging process.

It will also be appreciated from the above description of the invention that various modifications and changes may be made to the switch circuit means which has been described with respect to an exemplary embodiment of such circuit and which those skilled in the art will appreciate may be varied to accomplish the same results.

I claim:

1. An apparatus for identifying telephone cable pairs which may be in use by the customer without disturbing user service comprising:
   - a simplex device;
   - a tone source;
   - a pair of tapping leads for electrically connecting said simplex device and tone source to the telephone pair; and
   - capacity responsive switch circuit means for permitting application of the simplexed tone to the pair only when both of said pair of tapping leads are electrically connected to the telephone pair.

2. The apparatus of claim 1 wherein said switch circuit means comprises:
   - a source of electrical power;
   - an oscillator providing a signal having a frequency above the audible range;
   - a transformer having a primary winding connected to said oscillator and to said other tapping lead;
   - a relay switch connected to the secondary winding of said transformer; and
   - a transistor switch circuit connected between said relay switch and said secondary winding for controlling said relay switch, whereby the telephone pair capacitance completes the circuit means to operate the relay and permit application of the tone to the pair only when both of the tapping leads are electrically connected to the pair.

3. The apparatus of claim 2 wherein said transformer is tunable and connected in parallel with a capacitor.

4. The apparatus of claim 2 wherein said oscillator is coupled to said circuit through a transformer.

5. The apparatus of claim 2 wherein said transformer is connected to the other tapping lead through a blocking capacitor.

6. The apparatus of claim 2 wherein said transistor switch circuit includes a variable resistance for biasing one transistor to control the on/off level of said switch such that the capacitance load of at least a 50 foot length of telephone pair wires will cause the switch to turn on.

7. The apparatus of claim 6 wherein the switch level is such that the resistance load of a person's body will not cause the switch to turn on.

8. The apparatus of claim 1 wherein said tone source produces an audible tone of approximately 500 cycle frequency.

9. In an apparatus for identifying telephone cable pairs which may be in use by the customer without producing an audible signal on the pair comprising a signal source, a simplex device, a pair of manually attachable tapping leads for electrical connection of the apparatus to the telephone pair, the improvement comprising, a capacity responsive switch circuit for permitting a signal to be sent on the pair only when both tapping leads are electrically connected to the pair wires so that the capacitance of the pair provides a load.

10. The improvement of claim 9 wherein said switch circuit includes an oscillator producing a signal having a frequency above the audible range.

* * * * *